Oct. 25, 1949.  A. J. WILLIAMS, JR., ET AL  2,485,948
LOW-FREQUENCY CONVERTER-AMPLIFIER SYSTEM
Filed Jan. 31, 1947  4 Sheets-Sheet 1
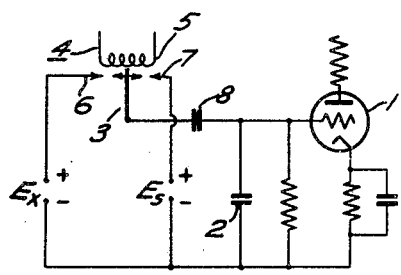
Fig.1.
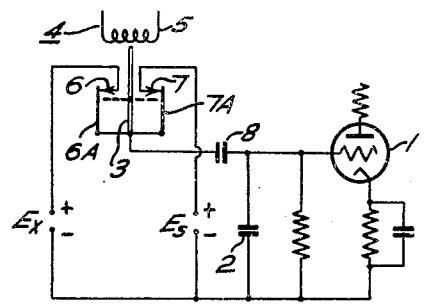
Fig.1-A.
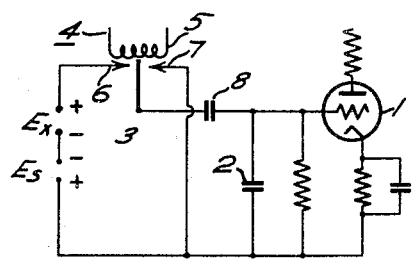
Fig.2.
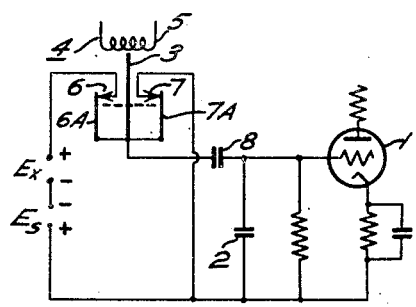
Fig.2-A.
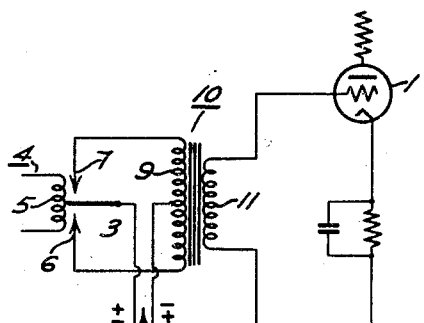
Fig.3.
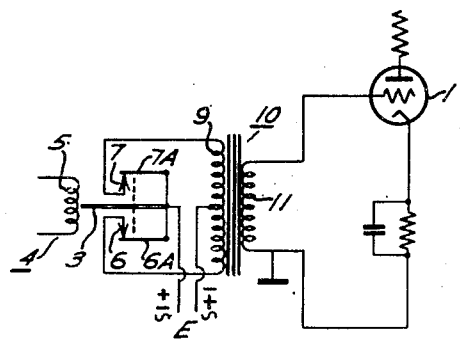
Fig.3-A.
INVENTORS
ALBERT J. WILLIAMS, JR.
RAYMOND E. TARPLEY
NORMA C. JOHNSON
BY
Woodcock and Phelan
ATTORNEYS INVENTORS
ALBERT J. WILLIAMS, JR.
RAYMOND E. TARPLEY
NORMA C. JOHNSON
BY
*Woodcock and Phelan*
ATTORNEYS Oct. 25, 1949.  A. J. WILLIAMS, JR., ET AL  2,485,948
LOW-FREQUENCY CONVERTER-AMPLIFIER SYSTEM
Filed Jan. 31, 1947  4 Sheets-Sheet 4

INVENTORS
ALBERT J. WILLIAMS, JR.
RAYMOND E. TARPLEY
NORMA C. JOHNSON
BY
Woodcock and Phelan
ATTORNEYS Patented Oct. 25, 1949

2,485,948

UNITED STATES PATENT OFFICE 2,485,948

LOW-FREQUENCY CONVERTER-AMPLIFIER SYSTEM

Albert J. Williams, Jr., and Raymond E. Tarpley, Philadelphia, and Norma C. Johnson, Merwood Park, Pa., assignors to Leeds and Northrup Company, Philadelphia, Pa., a corporation of Pennsylvania Application January 31, 1947, Serial No. 725,464

9 Claims. (Cl. 332—68)

This invention relates to systems in which small unidirectional currents or sub-audio frequency currents are converted into currents of predetermined audio-frequency suited for amplification by high-gain audio-frequency amplifiers to magnitudes of orders suitable for automatically indicating, recording or controlling purposes, and particularly concerns prevention of spurious signals due to electrical transients which otherwise cause false or unnecessary operation of the associated indicating, recording or controlling equipment.

In accordance with the present invention, in addition to the shielding and filtering provisions usually employed in high-gain audio-frequency amplifiers, there are provided special high-frequency shielding and filters to exclude high-frequency disturbances of continuous or momentary nature which would by demodulating action of the converter, be transformed into pulses, of random polarity and waveform, having frequency components amplified by the audio-frequency amplifier and appearing in the output thereof as spurious signals causing improper operation of the associated indicator, recorder or controller.

The invention further resides in features of construction, combination and arrangement hereinafter described and claimed.

For more detailed understanding of the invention, reference is made to the accompanying drawings in which:

Figs. 1 to 3 and 1A to 3A schematically show various input systems of converter-amplifier arrangements;

Figure 4:
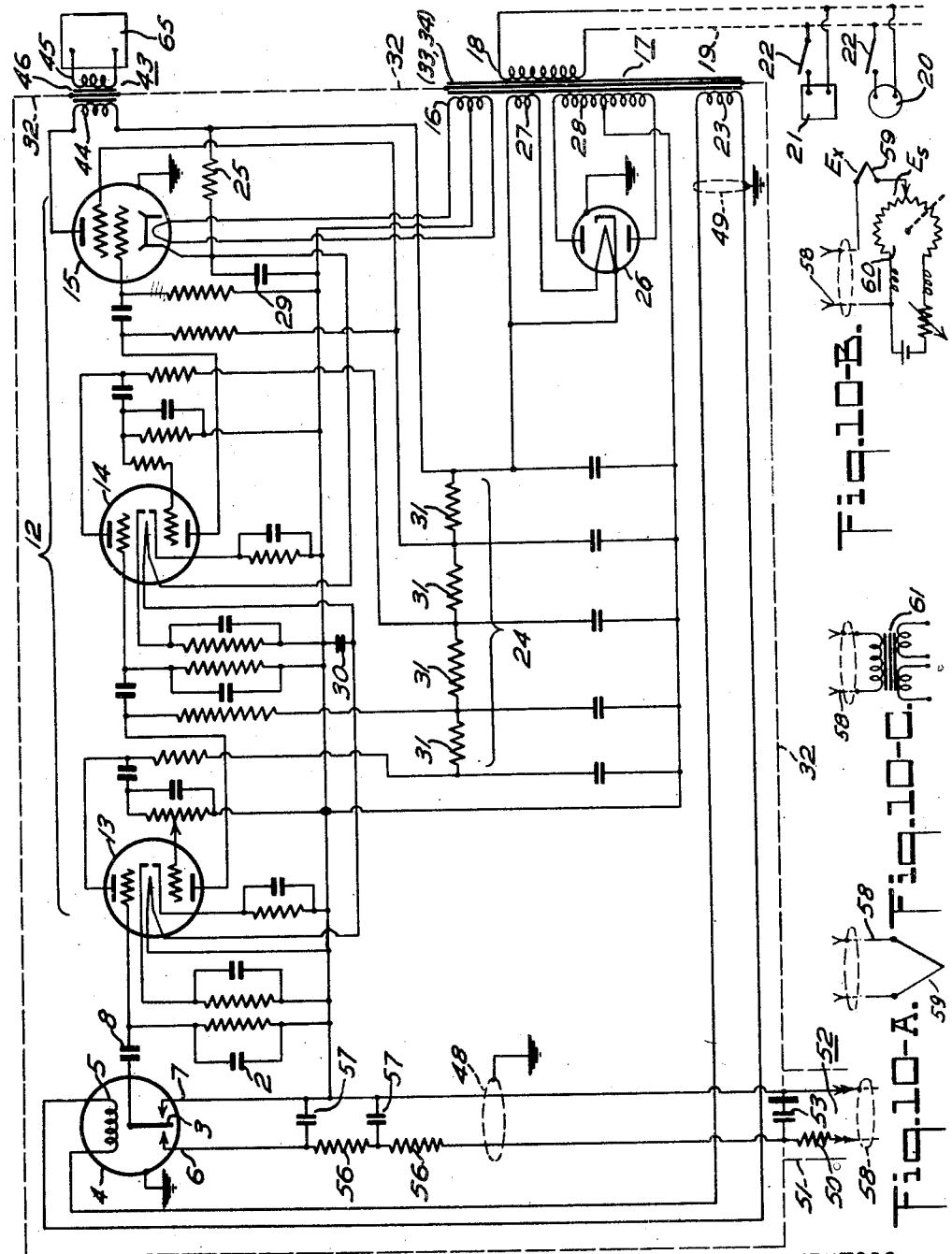
Fig. 4 is a schematic circuit diagram of a low-frequency converter-amplifier and its associated radio-frequency shielding and filtering systems.
Figure 12:
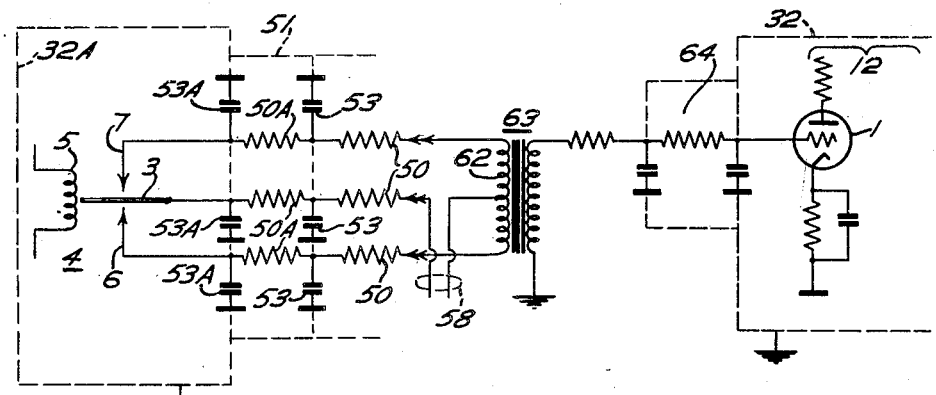
Figure 11:
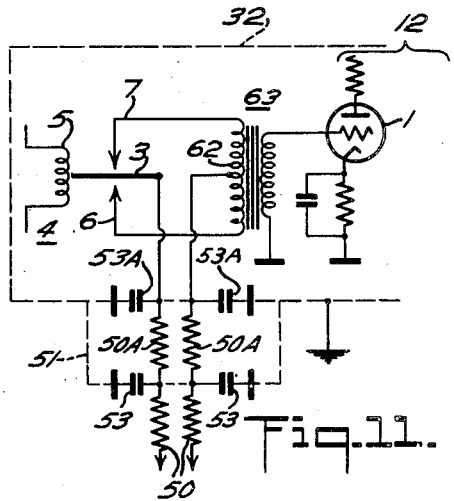

Figs. 10A, 10B and 10C schematically show various detector elements or arrangements for the converter amplifier systems of Figs. 4, 11 and 12;

Figs. 11 and 12 schematically illustrate other radio-frequency filtering and shielding arrangements suited for low-frequency converter-amplifier systems.

In preliminary discussion of the nature and source of difficulties arising in operation of systems of the character here under consideration, reference is made to Fig. 1 in which tube 1 is in the first stage of a multi-stage high-gain amplifier suited, for example, for amplification of audio-frequencies of the order of 60 cycles. The input circuit of the tube includes capacitative reactance 2 which may be a physical condenser or a phantom condenser formed by stray capacity of the grid lead, and parts connected thereto, to the cathode lead and parts connected thereto usually including the metal chassis of the amplifier.

To the grid lead of tube 1 is connected the reed 3 of a synchronous converter 4 whose driving coil 5 is energized by alternating current of frequency suited for amplification by the amplifier, which frequency in the example assumed is 60 cycles. As the reed 3 vibrates in synchronism with the current in coil 5, it alternately engages the fixed contacts 6 and 7, the former in circuit with a source of unknown unidirectional voltage $E_x$ and the latter in circuit with a similarly poled source of known unidirectional voltage $E_s$.

There is thus impressed upon the input circuit of the amplifier tube an alternating current whose amplitude is a function of the difference between the voltage $E_x$ and $E_s$ and whose frequency corresponds with the vibration rate of reed 3. This is the true signal intended to be amplified by the amplifier for impression upon an associated indicator, recorder or controller.

In explanation of previously unaccountable eccentricities of its operation, the converter-amplifier combination in fact also and unexpectedly produces spurious signals of the same frequency as the true signals when radio-frequency voltages are picked up by the input conductors of the vibrator. These radio frequency voltages may be of momentary nature as when due to operation of a switch or of more continuous nature when due, for example, to sparking or arcing at the brushes of a motor, the electrodes of an arc, dielectric heating equipment, radio apparatus and the like. The source of these disturbing high-frequency voltages though remote from the converter-amplifier may be near the leads extending to the vibrator contacts, to the driver coil 5, to the output circuit of the amplifier, or to the power supply circuits for the tubes. In all these cases, these high-frequency voltages appear as input voltages to the converter.

Because of capacitance intentionally provided or inherently present, the converter load is reactive and consequently capable of energy storage. At the instants of make or break between the reed 3 and the contacts 6 and 7, the radio-frequency voltage may be of one polarity or the other or zero, and in consequence is demodulated or converted into a spurious signal. More specifically, when the reed 3 leaves contact 6, the condenser 2 and condenser 8, if used, may or will have on it some charge. During the open time of the reed, that is, before it engages contact 7, this energy is released by the capacitative reactance, and since there is no path through the vibrator all of it appears between the input electrodes of tube 1 as a pulse having low frequency components which are amplified by tube 1 and the subsequent tubes. In like manner a pulse due to the high frequency is or may be generated each time the reed leaves contact 7.

Thus, so long as the disturbing radio-frequency persists, there are produced by the converter spurious signals which are amplified by the audio-frequency amplifier and cause false operation of the associated indicating, recording or control equipment. When the disturbing radio-frequency exists only momentarily as when a line switch is opened or closed, the resulting transient or pulse produced by the converter may be of little significance so far as indicating or recording is concerned, but may be of serious consequence for at least some control purposes. This general statement applies not only to Fig. 1 but to all figures (1–3A) herein shown.

In the system shown in Fig. 2, the input circuit of the vibrator for production of true signals is different from that of Fig. 1 but is also inherently subject to production of spurious signals by demodulation of high-frequency voltages.

In this system, when the reed 3 is in engagement with contact 6, the intentional charging voltage of the condenser 2 (or condensers 2 and 8, if the latter is used) is the difference between the oppositely poled unknown and reference voltages, $E_x$ and $E_s$ respectively. When the reed 3 moves from contact 6 into engagement with contact 7, the condenser or condensers are discharged. Accordingly, in intended operation of the system, as the reed vibrates alternately to engage the contacts 6 and 7, there is produced a true signal whose magnitude depends upon the difference between voltages $E_x$ and $E_s$, whose frequency corresponds with that of the vibrator, and whose phase depends upon the sense of the difference between the voltages $E_x$ and $E_s$.

Assuming as before that a high-frequency potential exists on contact 6 of the vibrator at time of separation of reed 3 therefrom, there is storage of energy in the reactance (capacitors 2, or 2 and 8) of the converter output system. In the interval before the subsequent engagement of reed 3 with the grounded contact 7, this energy is released by the reactance and appears between the input electrodes of tube 1 as a pulse having audio-frequency components amplified by tube 1 and subsequent tubes of the amplifier. With this system, so long as the disturbing radio-frequency potential exists, a pulse is or may be produced each time the reed 3 leaves contact 6.

Thus again, as with the system of Fig. 1, there are produced spurious signals responsible for undesired operation of associated devices or equipment.

In the system of Figs. 1 and 2, there are utilized two unidirectional voltages whose absolute polarities are not of significance but whose relative polarities must be observed: in both cases, the true signal voltage is alternating.

In the system of Fig. 3, the input voltage E of converter 4 may be unidirectional or it may be alternating provided the frequency is substantially lower than the operating frequency of the converter: this system too is inherently subject to production of spurious signals when high-frequency voltages appear in the input to the converter.

In this system, the voltage E utilized for indicating, recording or control purposes is connected between the reed 3 of the converter 4 and the center-tap of the primary winding 9 of a transformer 10 whose secondary 11 is connected to the input electrodes of tube 1. As the reed 3 alternately engages the fixed contacts 6 and 7, the current from source E alternately flows in the two halves of the primary winding 9 to provide an alternating current signal of vibrator frequency.

Again, however, the output or load system of the converter is reactive and consequently any high-frequency voltages in the input circuit of the converter are transformed into spurious random signals having components amplified by tube 1 and subsequent tubes. More specifically, high-frequency energy is present in the primary reactance of the transformer when the reed is in engagement with either of the contacts 6 and 7. At the instant of separation of the reed from either contact, the high-frequency energy then present is seldom zero and as dissipated during the "open" time of the contacts appears as a pulse across the secondary winding 11. This pulse, as in the other systems above discussed, has low frequency components amplified by the audio-frequency amplifier and results in false and unnecessary response of the associated equipment.

In the three systems above described, the converter is of the so-called "open" type, but converters of the "closed" type used in converter-amplifier systems, Figs. 1A to 3A, otherwise respectively corresponding with Figs. 1 to 3, also generate spurious signals when their input includes radio-frequencies.

Insofar as production of true signals is concerned, these systems are generally similar to those previously described and the following discussion of them is, therefore, for brevity limited mainly to their inherent undesired production of spurious signals.

With the closed type of converter of Fig. 1A, when the reed 3 is in its mid-position, the voltage sources $E_x$ and $E_s$ are both connected to input circuit of the amplifier, the former through the normally closed contacts 6, 6A of the converter and the latter through the normally closed contacts 7, 7A. As the reed vibrates, first one and then the other pair of contacts is opened and reclosed; both pairs of contacts are never simultaneously open. When either or both of the leads to contacts 6A, 7A pick up radio-frequency potentials, the making and breaking of the contacts affects the supply or dissipation of energy in the reactive output circuit of the converter and so generates pulses having components within the low or audio frequency range for which the amplifier is designed.

In the system shown in Fig. 2A, during the interval when the ground circuit through contacts 7, 7A is open, radio-frequency energy picked up by the lead to contact 6 from voltage sources $E_x$, $E_s$ is supplied to the reactive output circuit of the converter so that when the contacts 7, 7A reclose, the energy is dissipated in parallel paths to ground and part of it appears as a pulse across the input electrodes of tube 1.

Thus as in the other systems, the converter 4 not only performs its intended proper function, but also demodulates any high-frequency input to the converter to produce spurious output signals having frequency characteristics indistinguishable by the amplifier from the true signals.

In the system shown in Fig. 3A, radio-frequency energy picked up by the leads to the source of voltage E may be applied to the transformer through either or both of the contacts 6A, 7A while they are respectively in engagement with the fixed contacts 6, 7. At the instant both pairs of contacts are closed, there is a quantity of energy stored in that half of the transformer which has previously been in operation. This energy must change during the time when both pairs of contacts are closed because the energy storage in the two halves is unequal and at least part of the energy appears as a pulse across the transformer secondary.

It shall be understood that in the system of Fig. 3A as well as all of those previously discussed, the waveform and polarity of the individual pulses are of random nature. In some of these systems, the frequency at which the spurious pulses of energy are possible may be double that at which the reed is driven; these pulses may be positive or negative and will be positive about as frequently as negative. Consequently part of the time successive pulses may alternate in sign or polarity while part of the time successive pulses will have the same polarity. When the successive pulses alternate in sign, the spurious output frequency corresponds with the frequency of the vibrator while non-alternation of sign of successive pulses corresponds with an output frequency of double the vibrator frequency. In both cases, however, these spurious signals are amplified by tube 1 and subsequent amplifier tubes and cause false or undesired operation of the associated indicating, recording or controlling equipment.

The difficulties arising, as above discussed, in each of the foregoing systems, because of demodulating action of the converter 4, can be overcome, as will later herein become evident to those skilled in the art, by recourse to special high-frequency filtering and shielding provisions which for brevity are herein specifically disclosed and described only in connection with converter-amplifier systems otherwise corresponding with Figs. 2 and 3.

Referring to Fig. 4, the amplifier 12 is a five stage amplifier suited for amplifying small audio-frequency voltages, of the order of a few microvolts, to provide a power output capable of effecting actuation of a relatively insensitive indicator or motor employed as previously known in the art to actuate an indicator, recorder stylus or control switches and the like. In the system shown, the two tubes 13, 14 are of the dual type, such as the 12SL7GT type, and provide four stages of voltage amplification; the first section of tube 13 corresponds with tube 1 of Figs. 1 to 3A. The power output tube 15 of the amplifier is preferably of the 6L6 or equivalent type having high power-sensitivity.

The heater current for the output tube 15 is supplied by the secondary winding 16 of a power supply transformer 17 whose primary winding 18 is connected to a source of alternating current such as a 110 volt, 60 cycle line 19 to which may be connected other apparatus such as motors, radio-frequency generators, laboratory or industrial equipment, or other electrical devices generically represented by blocks 20, 21 which together with their control switches 22 are potential sources of continuous or intermittent radio-frequency disturbance.

The driver coil 5 of the synchronous converter 4 is also energized from the power line 19; preferably from a secondary winding 23 of the transformer 17. Consequently the output frequency of the converter 4 is the same as that of the power source or is harmonically related thereto depending upon whether the armature, not shown, of the reed 3 is a permanent magnet or soft iron. For most purposes and it is here assumed, the converter frequency and the line frequency are the same and the circuit constants of amplifier 12 are, therefore, selected for high-gain at the power line frequency. It is, therefore, necessary to take unusual precautions to prevent even small stray voltages of power-line frequency from being introduced into the amplifier, particularly in the earlier stages thereof.

To avoid production of spurious signals within the amplifier tubes 13 and 14, their heaters are supplied with direct current, instead of alternating current as usual, and one side of the heater of the first tube is grounded. This direct current is derived from the high-voltage filter network 24, through a voltage-dropping resistor 25, supplied with rectified alternating current by the full-wave rectifier tube 26. The heater current for tube 26 is supplied by the secondary winding 27 and the high voltage applied to its plates is supplied by the secondary winding 28. The plate current of the amplifier tubes is supplied from the filter network 24.

The condensers 29 and 30 of large capacity, such as 50 microfarads, provide for additional filtering of the direct current supplied from network 24 to the heaters of tubes 13 and 14. The series elements 31 of network 24 are resistors instead of choke coils to avoid stray magnetic fields and the power transformer 17, as shown in Figs. 5 and 6, is located remote from the input stage of the amplifier to minimize any stray fields from that source.

Figure 5:
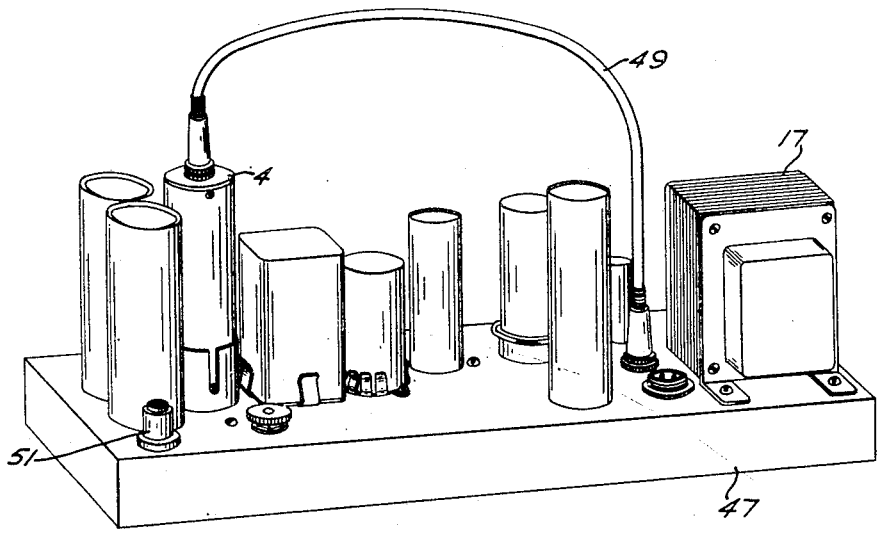
Fig. 5 is a perspective view showing the physical lay-out of components of the system of Fig. 4.
Figure 6:
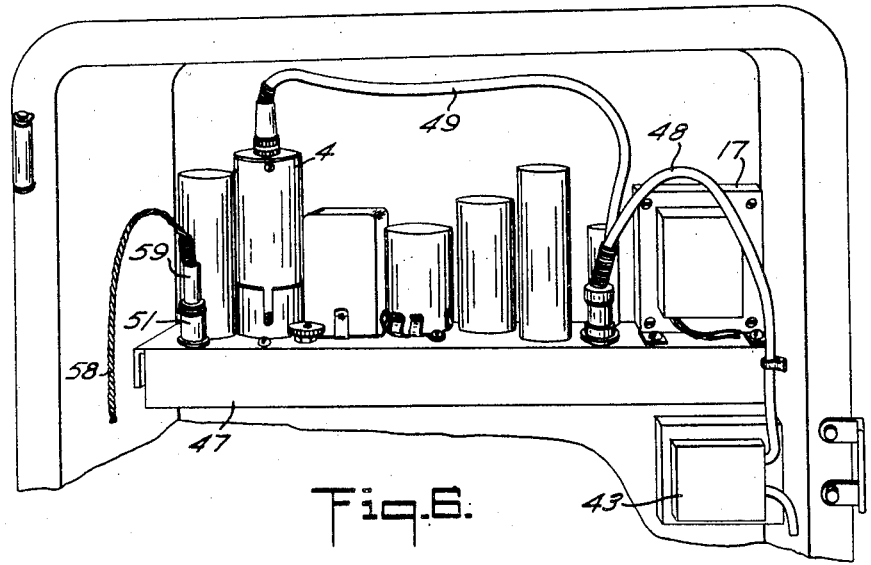
Fig. 6 is a perspective view including parts shown in Fig. 5 and other components of Fig. 4.

Also as shown in Figs. 5 and 6, the converter 4, the leads to its driver coil, the amplifier tubes, and all major circuit components are within grounded shielding generically represented in Fig. 4 by the shielding enclosure 32.

For reasons discussed in connection with Figs. 1 to 3A, however, all of these precautions though necessary are ineffective to prevent spurious signals of power line frequency when radio-frequency voltages in one way or other are introduced within the enclosure 32 and are demodulated by the converter 4.

Figure 7:
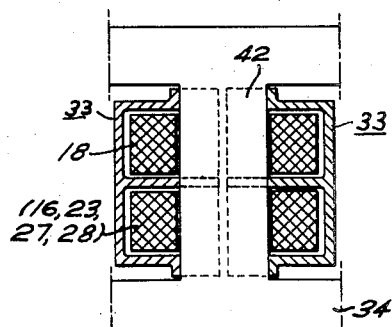
Fig. 7 is a fragmentary view partly in section of a transformer schematically shown in Fig. 4.

To preclude penetration of the shielding enclosure 32, via the transformer 17, of high-frequency voltages of transient or continuous nature and arising because of connection or proximity to the power line 19 of the devices 20, 21, the power transformer 17 is provided with a thick box shield 33, Fig. 7, cooperating with the grounded core 34 in effect to continue the shielding 32 internally of the transformer and so electrostatically to isolate the primary winding 18 from all of the secondary windings 16, 23, 27 and 28 of the transformer.

Figure 8:
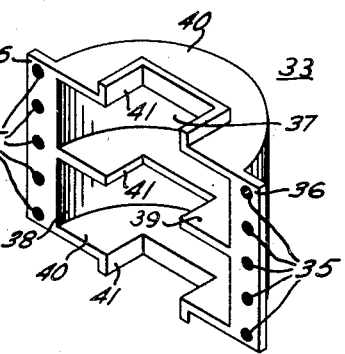
Fig. 8 is a perspective view of one-half of a box shield shown in Fig. 7.

The box shield 33 of thick, non-magnetic metal, preferably copper, is formed of two similar parts, one of which is shown in Fig. 8, which when held together as by bolts through the holes 35 in their side flanges 36 form a box having one compartment 37 for enclosing the primary coil 18 and a second compartment 38 for enclosing the secondary windings. The partition 39 between the compartments and the ends 40, 40 of the box 33 are notched at 41 to receive and snugly fit the leg 42 of the core 34. With the two halves of the box shield 33 in place, Fig. 7, the primary and secondary windings of transformer 17 are each completely encased in separate grounded metal compartments between which exchange of high-frequency energy is prevented.

It is thus insured that any high-frequency energy conducted by the power lines to the supply transformer for the amplifier 12 and converter 4 cannot enter the shield enclosure 33 via coupling between the transformer windings. This path for high-frequency energy which would be demodulated by the converter and so cause spurious signals is thus effectively blocked.

To prevent the box shield 33 from acting as a secondary of transformer 17, the two halves of the box may be separated by a thin sheet or film of insulating material; this has negligible effect upon the integrity of the shielding.

The output transformer 43 of amplifier 12 is provided with a similar box shield between its primary and secondary windings 44, 45 respectively to prevent any high-frequency energy picked up by the secondary circuit leads or components from being introduced via transformer 43 to within the shield enclosure 32 and there demodulated by converter 4 to produce spurious signals. Because the output transformer construction so far as here relevant is similar to that of transformer 17, it is not separately described and the continuation of the shield 32 effectively within it is schematically indicated in Fig. 4 by the connection of the transformer core-shield member 46 to the shielding system. As shown in Fig. 6, the output transformer 43 need not be on the chassis 47 of the converter-amplifier: in such event, the output conductors of the amplifier to the transformer are within a shielded lead 48, similar to the shielded lead 49 for the conductors to the driver coil 4, whose metallic sheath is connected at one end to the internal box shield of the transformer and at the other end to the chassis 47.

This special internal shielding of transformer 43 prevents entry into enclosure 32 of disturbing high-frequency energy via the path necessarily provided for the low-frequency output of the amplifier.

As for many uses of the converter-amplifier system, the input voltage of the converter is direct-current, as discussed in connection with Figs. 1 to 3A, it is not possible to use transformers, internally shielded as above described, to prevent high-frequency energy from entering the shielded enclosure 32. Instead a low-pass filter suited to by-pass all radio-frequencies, is included in the input leads to the converter. As in the system shown in Fig. 4, one of the vibrator contacts 7 is grounded, (as in Fig. 2), the filter is of the unbalanced type and the series impedance 50 is included in the conductor to the other, ungrounded vibrator contact 6. The series impedance 50, which may be a resistor of 10,000 ohms resistance, is external to the chassis 47 within the metal shield 51 for the input socket 52 of the converter.

Figure 9:
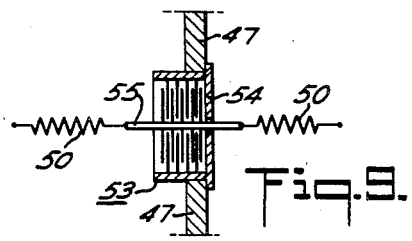
Fig. 9 is a sectional view of a feed-through condenser schematically shown in Figs. 4, 11 and 12.

The shunt capacitor 53 of the radio-frequency filter is of the feed-through button type, Fig. 9, having its metal shell 54 fitted to an opening in the chassis 47 so that one set of condenser plates serve as a continuation of shield 32 which thus extends nearly to and surrounds the feed-through conductor 55 to which the other set of condenser plates are electrically connected. For clarity, the dielectric between the plates is not shown. The capacity of condenser 53 may be of the order of 500 micro-microfarads.

The filter 50, 53 effectively prevents entry to within the shielded enclosure 32, Fig. 4, via the leads to source of low voltage to be measured, of radio-frequency energy which would otherwise be demodulated by the converter and produce spurious signals in the output of amplifier 12.

The resistors 56 and condensers 57 within the shield 32 and between the radio-frequency filter 50, 53 and the input terminals of the converter 4 form filter sections which also attenuate low frequencies: By way of example, the resistance of resistors 56 may be 10,000 ohms and the capacitance of capacitors 57 may be 4 microfarads.

The input cable 58, Figs. 4 and 6, for the converter-amplifier terminates at one end in a plug 59, of known type, detachably received by the shielded input socket 52 within which is disposed the radio-frequency filter 50, 53. At the other end of the cable, its conductors are connected to the voltage to be measured, recorded or controlled which as discussed in connection with Figs. 1 to 3A may be unidirectional or of frequency lower than the synchronous frequency of the converter. By way of example, the voltage to be measured may be that of a thermocouple 59, Fig. 10A, Fig. 10B; in the former case, the deflection method is used, whereas in the latter the null method is employed. Specifically, in Fig. 10B, as well understood in the art, the voltage of thermocouple 59 is balanced against that of a calibrated potentiometer 60 whose slidewire is automatically adjusted, by an electro-mechanical system controlled by the output of amplifier 12, generally as disclosed in U. S. Letters Patent 2,367,746.

When the primary detector output is alternating, as is the case with flux-gate magnetometers, for example, the input terminals of cable 58 may be connected to the output winding of a transformer 61, Fig. 10C.

With all of the various types of detector elements with which the converter-amplifier may be used, any radio-frequency of continuous or intermittent nature picked up by these elements or their leads is prevented from being demodulated by converter 4 by their exclusion from entry to within shield 32 by the radio frequency filter 50, 53.

When a transformer is used to couple the converter 4 to amplifier 12 and neither conductor of the input cable 58 is grounded, there may be used the arrangement shown in Fig. 11. More specifically, the terminals of the primary winding 62 of transformer 63 are connected respectively to the converter contacts 6, 7 and the input conductors to the converter are connected respectively to the converter reed 3 and to the center tap of the primary winding. In this case, the radio-frequency filter within the shield 51 for the input socket is of the balanced section type and each of the input conductors enters the shielding 32 through a button type condenser 53, such as shown in Fig. 9. The series impedance elements 50, 50 of the first filter section are each between one of the input terminals of the socket and its connection to the associated by-pass condenser 53. As indicated, a second filter section comprising series resistors 50A, 50A and shunt capacitors 53A may also be used.

Because of provision of the radio-frequency filter, there is no storage of high-frequency energy in the reactance of transformer 63, as discussed in connection with Figs. 3 and 3A, and consequently no demodulation producing a spurious signal of power-line frequency in the input circuit of amplifier 12.

When it is necessary or desirable to use the converter 4 and amplifier 12 as separate units, as shown in Fig. 12, each in its separate shield 32, 32A respectively, the radio-frequency filter for the converter is connected between the primary winding 62 of the coupling transformer 63 and a second radio-frequency filter 64 is connected between the secondary of the transformer and the input electrodes of the first tube of amplifier 12.

Each of the three paths from the primary winding 62 to the converter 4 includes a filter resistor 50 positioned just in advance of entry within the shielding 32A, and the conductor in entering goes through a button-type capacitor 53, Fig. 9, whose casing and one set of plates form a continuation of the shielding. Preferably, and as shown, this filter includes a second section, within the shell shield 51, comprising resistors 50A and feet-through capacitors 53A. This filter prevents transfer to the converter of any radio-frequency picked up by transformer 63, by input cable 58 or any detector elements or devices connected to the cable. The filter 64 prevents transfer into the amplifier shield of such radio-frequency energy which might be rectified by the amplifier tubes: this filter is not capable of excluding spurious signals of power-line frequency resulting from demodulation by the converter of radio-frequency which would reach it in absence of the high-frequency filter in the input circuit of the converter.

From the foregoing, it should be evident to those skilled in the art that should it be necessary or desirable to locate either or both the output transformer 43 of the amplifier and the power-supply transformer 17 outside of the amplifier shielding 32, the path therefrom to the amplifier should include a radio-frequency filter, such as filters 50, 53 above discussed, to avoid any transfer to the input circuit of the converter, by stray couplings, of radio frequency which may be picked up directly by the transformers or by conductors associated with them or else the transformers should be of the specially internally shielded type above described and the leads to the amplifier should be of the shielded type with the shielding connected to shield 32 of the amplifier and to the internal box shield of the transformers.

The nature of the instrument or device 65, Fig. 4, responsive to the output of amplifier 12, of course, depends upon the intended use of the converter-amplifier; it may, for example, be a recorder-controller of the type shown in U. S. Letters Patent 1,935,732, or of the high speed type such as shown in the aforesaid U. S. Letters Patent 2,367,746, and, by use of a suitable detector element, may, as well understood in the art, be employed to indicate, record or control the magnitude or changes in magnitude of a condition such as temperature, pressure, frequency, or the like.

It shall be understood that the invention is not limited to the specific arrangements disclosed and that changes and modifications may be made within the scope of the appended claims.

What is claimed is:

1. A converter-amplifier arrangement comprising a vibratory reed converter, a low-frequency amplifier in the output circuit of said converter for amplification at the converter frequency, a conductive shielding system enclosing said amplifier and said converter, a signal input circuit including leads external to said shielding system for supplying to said converter unidirectional current or sub-converter-frequency current, an amplifier output circuit including leads external to said shielding system, means including leads external to said shielding system for supplying power to the driving coil of said converter and to the tubes of said amplifier, and means for preventing production of spurious signals by the converter-amplifier comprising means for excluding from within said shielding system radio-frequency energy picked up by said external leads.

2. A low-frequency converter-amplifier arrangement as in claim 1 in which radio-frequency energy picked up by at least the leads of the signal input circuit is excluded by a radio-frequency filter at the point of entry of the leads to the shielding system.

3. A low-frequency converter-amplifier arrangement as in claim 1 in which the amplifier output circuit includes a transformer whose secondary winding connected to said external output leads is shielded from the primary coil by an internal radio-frequency shield encasing the primary winding and effectively forming a continuation of said shielding system.

4. A low-frequency converter-amplifier arrangement as in claim 1 in which the power supply means includes a transformer whose input winding connected to said external power leads is shielded from secondary windings supplying power to the driving coil of said converter and to the tubes of said amplifier by an internal radio-frequency shield encasing the secondary windings and effectively forming a continuation of said shielding system.

5. A low-frequency converter-amplifier arrangement as in claim 1 in which radio-frequency energy picked up by leads of the signal input circuit is excluded by a radio-frequency filter at the point of entry of the leads to the shielding system and in which radio-frequency energy picked up by the other leads is in each case excluded by a shield effectively forming a continuation of said shielding system and extending internally of a transformer to encase the winding or windings thereof connected within the shielding system to a component or components of the converter-amplifier.

6. A vibratory reed converter comprising a driving coil energizable from alternating current of predetermined low frequency, a shielding system for said converter, an input circuit for said converter including leads external to said shielding system for supplying unidirectional current or alternating current of frequency lower than said predetermined frequency for conversion to signals of said predetermined frequency, and means for preventing production of spurious signals by said converter comprising a radio-frequency filter in said input circuit at point of entry of said leads into said shielding system.

7. A converter-amplifier arrangement for converting unidirectional current or low frequency alternating current to signal current of predetermined higher audio frequency comprising a vibratory reed converter having a driving coil energizable by current of said predetermined audio-frequency, a high-gain audio-frequency amplifier in the output system of said vibrator, a shielding system encasing said converter, said amplifier and their power supply, means within said shielding system for preventing production of spurious signals by currents from said power supply, and additional means for preventing production of spurious signals comprising filtering and shielding means excluding from within said shielding system radio-frequency currents picked up by leads external thereto and connected to said converter, said amplifier and their power supply.

8. A converter-amplifier arrangement comprising a vibratory reed converter, a multi-stage low-frequency amplifier in the output system of said converter, a transformer having a secondary winding for supplying alternating current for the driving coil of said converter, a rectifier associated with another secondary winding of said transformer for supplying the anode current of the tubes of said amplifier and the heater current of at least the earlier stages thereof, a shielding system encasing the converter, the amplifier, the rectifier and said secondary windings, and a radio-frequency filter in the input circuit of said converter at the point of entry of external input leads.

9. A converter-amplifier arrangement comprising a vibratory reed converter, a multi-stage low-frequency amplifier in the output system of said converter, an output transformer for said amplifier, a power transformer having a secondary winding for supplying alternating current to the driving coil of said converter, a rectifier associated with another secondary winding of said power transformer for supplying the anode current of the tubes of said amplifier and the heater current of at least the earlier stages thereof, a shielding system encasing the converter, the amplifier, the rectifier, the primary winding of said output transformer and the secondary windings of said power transformer, and a radio-frequency filter in the input circuit of said converter at the point of entry of external input leads.

ALBERT J. WILLIAMS, Jr.
RAYMOND E. TARPLEY.
NORMA C. JOHNSON.

REFERENCES CITED

The following references are of record in the file of this patent:

UNITED STATES PATENTS

| Number | Name | Date |
|---|---|---|
| 1,557,229 | Jobel | Oct. 13, 1925 |
| 2,096,962 | Dressel | Oct. 26, 1937 |
| 2,141,369 | Alexander | Dec. 27, 1938 |
| 2,176,447 | Vilkomerson | Oct. 17, 1939 |
| 2,221,105 | Otto | Nov. 12, 1940 |
| 2,229,373 | Cole | Jan. 21, 1941 |
| 2,297,659 | Lorant | Sept. 29, 1942 |
| 2,353,429 | Andrews | July 11, 1944 |